United States Patent
Coretto et al.

(10) Patent No.: US 12,268,981 B2
(45) Date of Patent: Apr. 8, 2025

(54) MOTORIZED VALVE WITH WASHING FILTER EXTENDING FROM A BLEED CONDUIT INLET INTO VALVE DUCT

(71) Applicant: Hamilton Sundstrand Corporation, Charlotte, NC (US)

(72) Inventors: August M. Coretto, Windsor, CT (US); David J. Zawilinski, West Granby, CT (US); Scott W. Simpson, Feeding Hills, MA (US); Peter J. Dowd, Granby, CT (US); Robert DeFelice, South Windsor, CT (US); John M. Dehais, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 448 days.

(21) Appl. No.: 17/678,358

(22) Filed: Feb. 23, 2022

(65) Prior Publication Data

US 2023/0264132 A1 Aug. 24, 2023

(51) Int. Cl.
| | |
|---|---|
| *B01D 53/22* | (2006.01) |
| *B01D 46/24* | (2006.01) |
| *B01D 46/44* | (2006.01) |
| *B01D 46/52* | (2006.01) |
| *B64D 13/06* | (2006.01) |
| *F16K 11/22* | (2006.01) |
| *F16K 11/24* | (2006.01) |
| *F16K 31/04* | (2006.01) |

(52) U.S. Cl.
CPC .......... *B01D 46/44* (2013.01); *B01D 46/2411* (2013.01); *B01D 46/521* (2013.01); *B64D 13/06* (2013.01); *F16K 11/22* (2013.01); *F16K 11/24* (2013.01); *F16K 31/04* (2013.01); *B64D 2013/0618* (2013.01); *B64D 2013/0644* (2013.01); *B64D 2013/0651* (2013.01)

(58) Field of Classification Search
CPC ............ B64D 13/06; B64D 2013/0618; B64D 2013/0651; B64D 2013/0644; B01D 46/521; B01D 46/44; B01D 46/2411; F16K 11/24; F16K 31/04; F16K 11/22
See application file for complete search history.

(56) References Cited

U.S. PATENT DOCUMENTS

| | | | | |
|---|---|---|---|---|
| 5,627,328 | A * | 5/1997 | Sheridan | G01N 33/0031 73/863.83 |
| 6,027,553 | A * | 2/2000 | Hirano | B01D 46/0098 55/497 |
| 9,483,061 | B2 | 11/2016 | Simpson | |

(Continued)

OTHER PUBLICATIONS

Extended European Search Report for EP Application No. 23156931.0, dated Jul. 13, 2023, pp. 1-7.

*Primary Examiner* — Anthony R Shumate
(74) *Attorney, Agent, or Firm* — CANTOR COLBURN LLP

(57) ABSTRACT

Disclosed is a valve assembly, having: a valve duct having an upstream end, a downstream end and a duct wall extending from the upstream end to the downstream end; a first conduit extending from a first end at the valve duct to a second end spaced apart from the first end, the first conduit terminating at a valve assembly component; and a washing filter that includes filer media, wherein the filter media extends into the valve duct to remove particles and provide a clean flow to the first conduit.

7 Claims, 3 Drawing Sheets

(56) References Cited

U.S. PATENT DOCUMENTS

| | | |
|---|---|---|
| 10,066,507 B1 | 9/2018 | Parnin |
| 2003/0145603 A1 | 8/2003 | Reed et al. |
| 2004/0208804 A1* | 10/2004 | Hall ................. B64D 13/00 422/186.04 |
| 2004/0209258 A1* | 10/2004 | Parthasarathy ........ B01J 47/016 536/25.4 |
| 2005/0247244 A1* | 11/2005 | So ................. F24C 15/2057 110/215 |
| 2010/0083646 A1* | 4/2010 | Poppe ................. F01N 3/0211 60/311 |
| 2010/0301238 A1 | 12/2010 | Krake et al. |
| 2011/0206646 A1* | 8/2011 | Alfonso ............... C12N 5/0651 424/93.7 |
| 2013/0048547 A1* | 2/2013 | McKenna ............. F24F 1/0063 210/167.3 |
| 2024/0059832 A1* | 2/2024 | Kuwahara ............ C08G 18/758 |

* cited by examiner

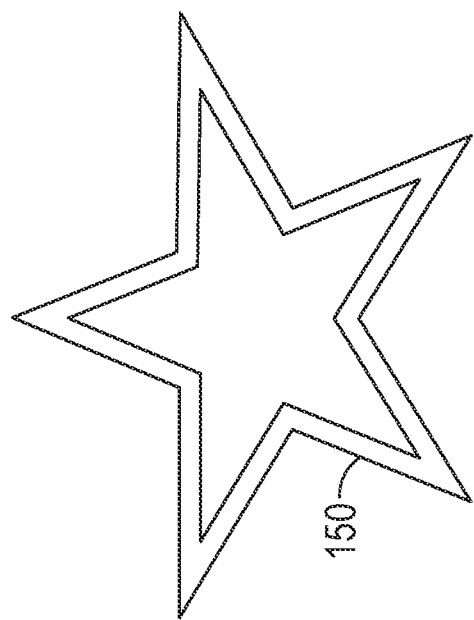
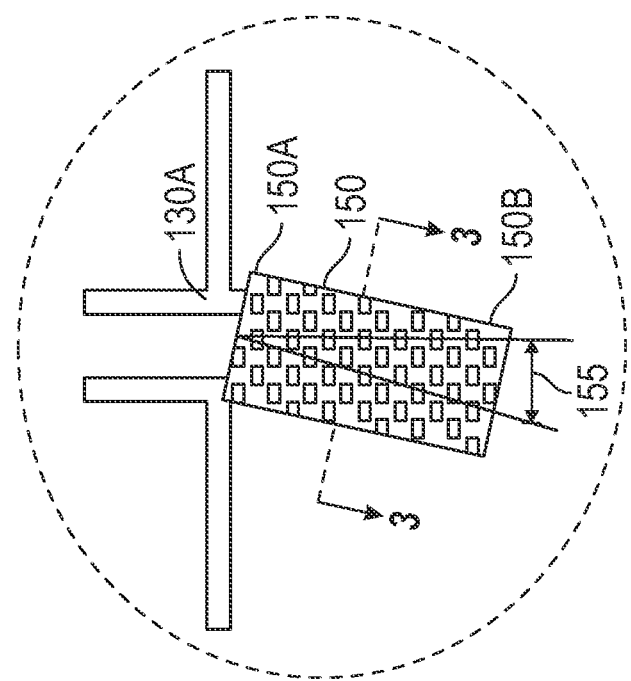

MOTORIZED VALVE WITH WASHING FILTER EXTENDING FROM A BLEED CONDUIT INLET INTO VALVE DUCT

BACKGROUND

The embodiments relate to valves and more specifically to a motorized valve with a washing filter extending from bleed conduit inlet into the valve duct.

Valves (e.g., gas or fluid) may utilize bleed conduits to bleed a portion of a flow to an internal piston assembly that drives a valve closure. Internal motors may control the extent that bleed flow reaches the piston assemblies. Such motors may have a low tolerance for exposure to debris.

BRIEF SUMMARY

Disclosed is a valve assembly, including: a valve duct having an upstream end, a downstream end and a duct wall extending from the upstream end to the downstream end; a first conduit extending from a first end at the valve duct to a second end spaced apart from the first end, the first conduit terminating at a valve assembly component; and a washing filter that includes filer media, wherein the filter media extends into the valve duct to remove particles and provide a clean flow to the first conduit.

In addition to one or more of the above aspects of the valve assembly, or as an alternate, the washing filter extends from the first end of the conduit into the valve duct.

In addition to one or more of the above aspects of the valve assembly, or as an alternate, the washing filter is jacketless; the washing filter is configured with a 5 micrometer filter rating; and the washing filter defines 1.5 square inches (9.7 sq·cm) of minimum effective filter area.

In addition to one or more of the above aspects of the valve assembly, or as an alternate, the washing filter is corrugated or cylindrical.

In addition to one or more of the above aspects of the valve assembly, or as an alternate, the valve assembly further includes: a closure disposed within the valve duct between the upstream and downstream ends, and downstream of the washing filter; a shaft connected to the closure; and a torque motor operatively coupled to the shaft.

In addition to one or more of the above aspects of the valve assembly, or as an alternate, the valve assembly is a butterfly valve and the closure is a plate.

In addition to one or more of the above aspects of the valve assembly, or as an alternate, the valve assembly further includes: a housing; a piston assembly disposed within the housing, the piston assembly including a piston chamber, the piston chamber defining a first wall and a second wall that is opposite the first wall, and a transverse wall extending from the first wall to the second wall, the first wall defining a first chamber aperture, the piston assembly including a first piston configured to move in the piston chamber between the first and second walls to define a first pressure chamber between the first piston and the first wall, the first piston being operationally connected to the shaft, wherein the valve assembly component is a flow chamber disposed in the housing, wherein the second end of the first conduit terminates at the at the flow chamber; a second conduit extending from a first end at the flow chamber to a second end at the first chamber aperture; a control member in the flow chamber that is configured to control access from the first conduit into the flow chamber, to thereby control access to the second conduit; and wherein the torque motor is disposed in the housing and configured to control the control member.

Further disclosed is an aircraft system including: an air duct; a valve assembly having one or more of the above disclosed aspects of the valve assembly, wherein the valve duct is coupled to the air duct; and an aircraft system controller configured to control the motor.

Further disclosed is a method of operating a valve assembly, including: directing a flow through a valve duct; and directing a first portion of the flow into a first end of a first conduit in the valve duct, via a washing filter that includes filter media, wherein the filter media extends into the valve duct, so that particles are removed from the first portion of the flow, and the first portion flows toward a second end of the first conduit at a valve assembly component.

In addition to one or more of the above aspects of the method, or as an alternate, the method further includes: controlling a torque motor to thereby control a shaft, and thereby control a closure in the valve duct.

In addition to one or more of the above aspects of the method, or as an alternate, the method further includes controlling the torque motor with an aircraft system controller.

In addition to one or more of the above aspects of the method, or as an alternate, the flow through the valve duct is air, flowing at greater than at least 10 feet per second (3 m/s).

In addition to one or more of the above aspects of the method, or as an alternate, the washing filter extends from the first end of the conduit into the valve duct.

In addition to one or more of the above aspects of the method, or as an alternate, the washing filter is jacketless; the washing filter is configured with a 5 micrometer filter rating; and the washing filter defines 1.5 square inches of minimum effective filter area.

In addition to one or more of the above aspects of the method, or as an alternate, the washing filter is corrugated or cylindrical.

BRIEF DESCRIPTION OF THE DRAWINGS

The present disclosure is illustrated by way of example and not limited in the accompanying figures in which like reference numerals indicate similar elements.

FIG. 2 is a detail view of the filter within the valve assembly;

FIG. 3 is an embodiment of a cross-sectional view of the filter along lines 3-3 of FIG. 2.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1:
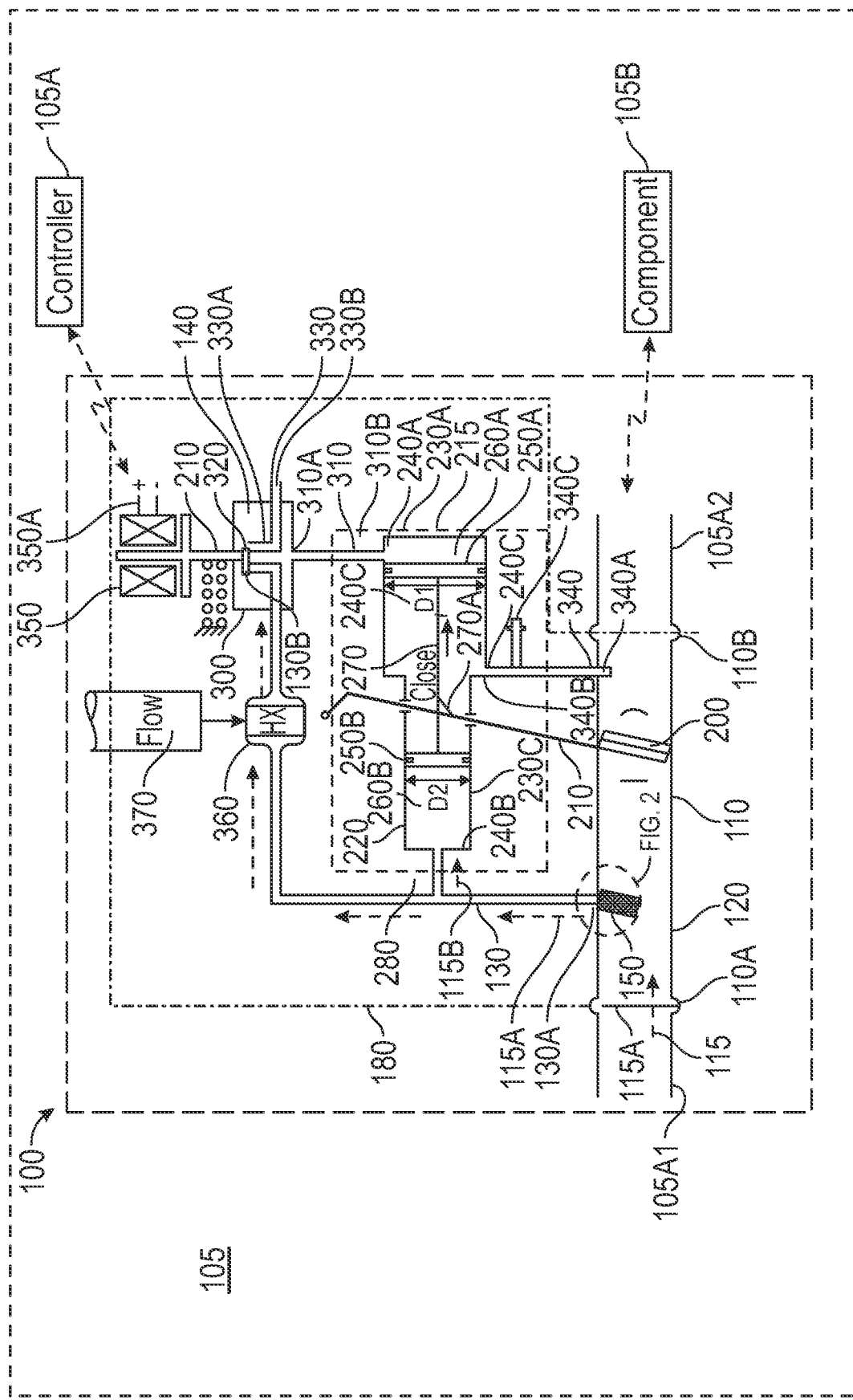
FIG. 1 is a schematic view of a valve integrated into an aircraft system according to an embodiment.

As shown in FIG. 1 and disclosed in greater detail below, the embodiments provide a valve assembly 100 (for gases or fluids) with a closure disk 200 (or closure 200) that is actuated by utilizing a motor 350 to direct flow from Flow Field 115 through bleed conduit (first conduit) 130 toward a piston assembly 215. To protect the motor 350 from flowborne debris, a washing filter 150 is provided. In contrast to prior art filters, the illustrated filter 150 is provided such that it is located at the inlet (first end) 130A of the bleed conduit (first conduit) 130 and extends into the valve flow field 115 defined by the valve duct 110. The flow field 115 in the duct 110 prevents the buildup of debris that could otherwise clog the filter 150. This is in contrast to prior art systems that where the filter was not in the flow field but, rather, was disclosed outside of it and within the bleed conduit 130 (e.g., downstream of the inlet 130A of the first conduit 130). Thus, the embodiments avoid the maintenance and pressure drops associated with clogged filters. The valve assembly 100 may be integrated into an aircraft system 105, having a system controller 105A that controls the motor 350 via communication/power lines 350A, so that the valve assembly 100 may be controlled to deliver a flow to a component 105B.

The assembly 100 includes the valve duct 110 having an upstream end 110A, a downstream end 110B and a duct wall 120 extending from the upstream end 110A to the downstream end 110B. The flow 115 that may pass through the duct 110 may be, e.g., gas such as engine bleed air or cabin air, depending on the application of the valve assembly 100. The first (bleed) conduit 130 extends from the first (or upstream) end 130A (e.g., a bleed inlet) at the valve duct 110 to a second end or downstream end 130B spaced apart from the first end 130A. The first conduit 130 terminates at a valve assembly component 140 after passing through an optional heat exchanger 360. The first conduit 130 may bleed off a first portion 115A of the flow 115 (e.g., bleed flow).

According to an embodiment, the washing filter 150 (referred to as filter 150 for simplicity) includes filter media that 130 extends into the valve duct 110 to remove particles from a flow 115 and provide a clean flow to the first conduit 130. As illustrated, the filter media extends from the first end 130A of the first conduit 130. However, other supplemental elements could be placed between the first end 130A of the first conduit 130 and the filter media 150. As shown in FIG. 2, the filter 150 may be positioned at an angle 155 so that its lower end 150B, further from the conduit inlet 130A, is upstream of its upper end 150A closer to/at the conduit inlet 130A. As the filter is in the same valve bore as the disc, it may be arranged in such a way as to avoid contact with the disc. Angling the filter, or including a supplemental element, such as a small section of sealed tube between filter and wall, could be used to make sure the filter packages well. In addition, a filter spaced slightly from the wall with a supplemental element may stay slightly cleaner as the flow velocity is lowest close to the wall.

According to an embodiment, the filter 150 is jacketless. That is, there is no external housing to the filter 150. Thus, the filter media is directly engaged by the flow 115 through the duct 110. In one embodiment, the filter 150 is configured with a 5 micrometer filter rating. In one embodiment, the filter 150 defines 1.5 square inches (9.7 sq. cm) of minimum effective filter area. As shown in FIG. 3, the filter media may be configured as a pleated (corrugated) cylinder to increase its surface area density, though a circular cross section is within the scope of the disclosure. A cartridge size may be approximately 1 inches by ~0.5 inches (2.5×1.25 cm). An estimated airflow washing velocity may be 65.9 ft/s (20 m/s) in one embodiment which is sufficient to keep the exposed surface of the filter clean. For air operations, a filter open area may be approximately ~0.08 square inches (0.5 square cm) in one embodiment. Due to the low consumption of bleed air necessary to actuate piston 215 and filter density, flow velocity thru the filter is less than flow velocity around the filter, so contaminants will be carried with process air past the filter. The valve portions exposed to flow field 115 e.g. closure disc 200 are significantly more capable of operating in a contaminated environment than the valve portions within the bleed conduit 130 e.g. controller 105a. The size of an embodiment as discussed above is significantly smaller than the current state of the art air filters where the filter is disposed within bleed circuit 130 and captures contamination within the filter.

Turning back to FIG. 1, according to additional details of the embodiments, the valve assembly 100 has a housing 180. The closure 200 is disposed within the valve duct 110 between the upstream and downstream ends 110A, 110B. A shaft 210 is connected to the closure 200. According to an embodiment, the first end 130A of the first conduit 130 is upstream of the closure 200.

The piston assembly 215 is disposed within the housing 180. The piston assembly 215 includes a piston chamber 220. The piston chamber 220 defines a first wall 230A and a second wall 230B that is opposite the first wall 230A. A transverse wall 230C extends from the first wall 230A to the second wall 230B. The first wall 230A defines a first chamber aperture 240A.

The piston assembly 215 includes one or more pistons generally referenced as 250. That is, a first piston 250A is configured to move in the piston chamber 220 between the first and second walls 230A, 230B to define a first pressure chamber 260A between the first piston 250A and the first wall 230A. The first piston 250A is operationally connected to the shaft 210. According to an embodiment, the piston assembly 215 includes a second piston 250B disposed in the piston chamber 220, between the first piston 250A and the second wall 230B. This defines a second pressure chamber 260B between the second piston 250B and the second wall 230B and a third pressure chamber 260C between the first and second pistons 250A, 250B. The transverse wall 230C of the piston chamber 220 has a third chamber aperture 240C leading to the third pressure chamber 260C.

A rod 270 extends between the first and second pistons 250A, 250B so that they move together. The shaft 210 is pivotally coupled to the rod 270 via pivot link 270A to pivot the closure disk 200 from the opened to the closed state. According to an embodiment, the second wall 230B of the piston chamber 220 has a second chamber aperture 240B. The first conduit 130 includes a first branch 280 located intermediate the first and second ends 130A, 130B of the first conduit 130. The first branch 280 may direct a segment 115B of the flow portion 115A to it and through the second chamber aperture 240B and into the second pressure chamber 240B.

According to an embodiment, the valve assembly component 140 is a flow chamber 300 disposed in the housing 180. The second end 130B of the first conduit 130 terminates at the at the flow chamber 300. A second conduit 310 extends from a first end 310A at the flow chamber 300 to a second end 310B at the first chamber aperture 240A. A control member 320 is located in the flow chamber 300. The control member 320 may be, e.g., a disk connected to a motor driven shaft 210 that is offset from a center of the disk, though this is not intended on limiting the scope of the embodiments. The control member 320 is configured to control access of the flow from the first conduit 130 into the flow chamber 300. This configuration provides for the control member 320 controlling access of the flow 115A to the second conduit 310. In one embodiment, a vent conduit 330 may extend from a first end 330A at the flow chamber 300 to a second end 330B, exterior to the flow chamber 300. This prevents a buildup of back pressure when the first conduit is closed off and the valve is moved to the normally closed state.

According to an embodiment, the valve assembly 100 includes a third conduit 340 extending from a first end 340A at the valve duct 110 to a second end 340B at the third chamber aperture 240C. According to an embodiment, the third conduit 340 includes a vent port 340C located intermediate the first end 340A of the third conduit 340 and the third chamber aperture 240C. This prevents a buildup of pressure in the third pressure chamber 260C of the piston chamber 220.

According to an embodiment, the piston chamber 220 has a first diameter D1 between the third chamber aperture 240C and the first wall 230A and a second diameter D2 between the third chamber aperture 240C and the second wall 230B. The first diameter D1 is greater than the second diameter D2. Thus, the valve will open relatively easily due to the imbalance of forces between the first and second pistons 250A, 250B.

According to an embodiment, the control member 320 is configured to operationally engage the first end 130A of the first conduit 130 and the first end 330A of the vent conduit 330. A first state, the second end 130B of the first conduit 130 is blocked and the first end 330A of the vent conduit 330 is unblocked. In a second state, the second end 130B of the first conduit 130 is unblocked and the first end 330A of the vent conduit 330 is blocked.

In one embodiment, the motor 350 is disposed in the housing 180 and configured to control the control member 320. The motor 350 may be a torque motor. The valve assembly 100 may be a butterfly valve and the closure 200 may be a plate.

According to an embodiment, the heat exchanger 360 may be positioned within the first conduit 130, intermediate the first and second ends 130A, 130B. A cooling conduit 370 may extend into the housing 180 and be coupled to the heat exchanger 360. Thus, the bleed flow 115A may be treated to main operability of components downstream of it, including the motor 350.

In one embodiment, the valve assembly 100, as indicated, may be integrated into an aircraft system 400. The valve duct 110 may be coupled to an air duct 410 of the aircraft system 105, via upstream and downstream ducts 105A1, 105A1 of the aircraft system 105. The aircraft controller 105A may be configured to control the motor 350, and flow in the valve duct 110 may be directed to the aircraft component 105B Uses of air valves would be, e.g., engine bleed air for de-icing of engine and wings, engine bleed air to make starting engine easier, air management systems for conditioning cabin air.

Figure 4:
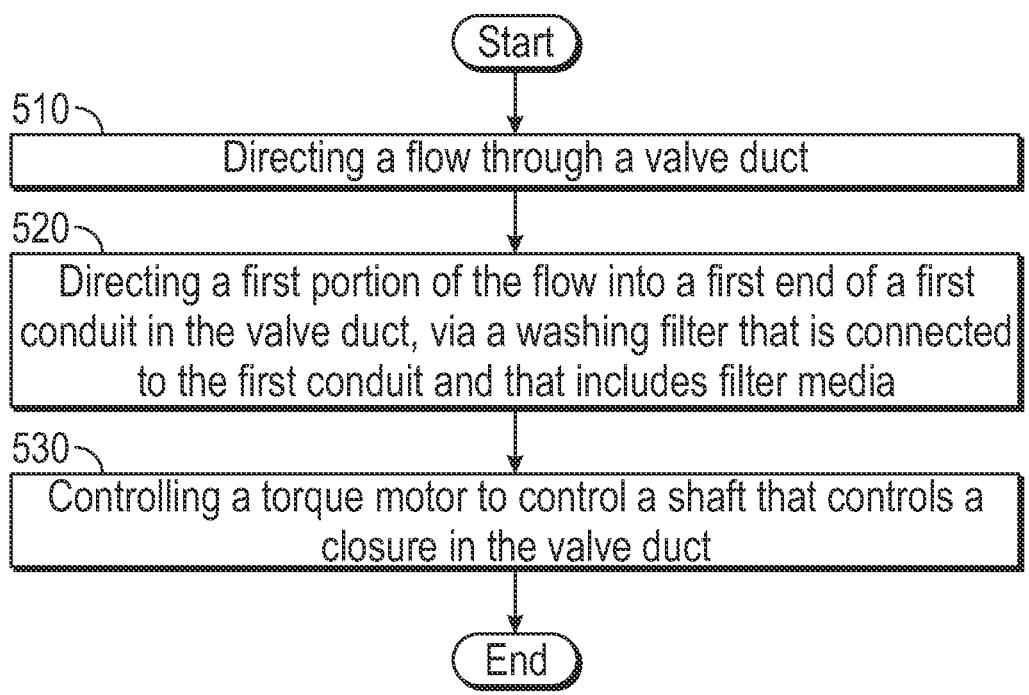
FIG. 4 is flowchart showing a method of operating a valve according to an embodiment.

Turning to FIG. 4, flowchart shows a method of operating a valve assembly 100. As shown in block 510, the method includes directing a flow 115 through a valve duct 110. As shown in block 520, the method includes directing a first portion 115A of the flow 115 into a first end 130A of a first conduit 130 in the valve duct 110, via a washing filter 150 that is connected to the first conduit 130 and that includes filter media 160. The media 160, as indicated, extends into the valve duct 110. From this configuration, particles are removed from the first portion 115A of the flow 115, and the first portion 115A flows toward a second end 130B of the first conduit 130 at a valve assembly component 140. As indicted above, the valve assembly component 140 is a flow chamber 300.

As shown in block 530, the method further includes controlling a torque motor 350 to thereby control a shaft 210 that controls a closure 200 in the valve duct 110. More specifically, the motor 350 controls the control member 320 in the flow chamber 300. This unblocks the second end 130B of the first conduit 130 so that the first portion 11A of flow 115 flows into the flow chamber 300. The flow portion 115A thereafter flows into a piston chamber 220 via a second conduit 310 that is connected between the flow chamber 300 and the piston chamber 220. This action moves one or more pistons 250 in the piston chamber 220 that are connected to a shaft 210. As a result, a closure 200 in the valve duct 110 is controlled to close.

With the above embodiments, by placing the filter 150 into a flow 115, the filter does not need to be sized by considering a contamination holding quantity because it is normally clean. That is, the filter element is directly exposed to flow, and flows out-to-in, and so does not hold contamination as a filter element would if contained within a enclosure, or flowing in-to-out. Therefore any contamination that does not pass through the filter instead continues flowing downstream. Thus, the filter 150 can be sized to account for pressure drop and flow path protection. Flow strength to clean the filter can be continuous or intermittent and can be specifically controlled to provide for cleaning bursts of flow.

The filter 150 can be a laser drilled or wire mesh screen. The filter 150 may be relatively small compared with filters that are required to withstand the buildup of debris over time. Placing the filter at the inlet 130A of the first conduit 130 rather than downstream in the first conduit 130 decreases complexity of the system, build cost, and avoids maintenance requirements, while enabling a consistent as flow area over time into the first conduit 130.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A valve assembly, comprising:
a valve duct having an upstream end, a downstream end and a duct wall extending from the upstream end to the downstream end, a first conduit extending from a first end at the valve duct to a second end spaced apart from the first end, the first conduit terminating at a valve assembly component, and a washing filter that includes filter media, wherein the filter media extends into the valve duct to remove particles and provide a clean flow to the first conduit, wherein the washing filter extends from the first end of the first conduit into the valve duct; a closure disk disposed within the valve duct between the upstream and downstream ends, and downstream of the washing filter; a shaft connected to the closure disk, and a torque motor operatively coupled to the shaft;

a housing, a piston assembly disposed within the housing, the piston assembly including a piston chamber, the piston chamber defining a first wall and a second wall that is opposite the first wall, and a transverse wall extending from the first wall to the second wall; the first wall defining a first chamber aperture; the piston assembly including a first piston configured to move in the piston chamber between the first and second walls to define a first pressure chamber between the first piston and the first wall the first piston being operationally connected to the shaft, the valve assembly component is a flow chamber disposed in the housing, and the second end of the first conduit terminates at the at the flow chamber; and a second conduit extending from a first end at the flow chamber to a second end at the first chamber aperture, a control member, that is a disk connected to a motor drive shaft, in the flow chamber that is configured to control access from the first conduit into the flow chamber, to thereby control access to the second conduit; and wherein the torque motor disposed in the housing is configured to control the control member.

2. The valve assembly of claim 1, wherein:
the washing filter is jacketless;
the washing filter is configured with a 5 micrometer filter rating; and
the washing filter defines 1.5 square inches (9.7 sq·cm) of minimum effective filter area.

3. The valve assembly of claim 1, wherein the washing filter is corrugated or cylindrical.

4. The valve assembly of claim 1, wherein the valve assembly is a butterfly valve and the closure is a plate.

5. An aircraft system including:
an air duct;
the valve assembly of claim 1, wherein the valve duct is coupled to the air duct; and
an aircraft system controller configured to control the motor.

6. The assembly of claim 1, wherein
a second piston is disposed in the piston chamber, between the first piston and the second wall, defining a second pressure chamber between the second piston and the second wall and a third pressure chamber between the first and second pistons; a rod extends between the first and second pistons so that the first and second pistons move together; the shaft is pivotally coupled to the rod via a pivot link to pivot the closure disk from an opened to a closed state; the second wall of the piston chamber has a second chamber aperture; the first conduit includes a first branch located intermediate the first and second ends of the first conduit; the first branch directs a segment of the flow portion to the second chamber aperture and into the second pressure chamber.

7. The assembly of claim 6, wherein
the valve assembly includes a third conduit extending from a first end at the valve duct to a second end at the third chamber aperture; the third conduit includes a vent port located intermediate the first end of the third conduit and the third chamber aperture, preventing a buildup of pressure in the third pressure chamber of the piston chamber.

* * * * *